(12) United States Patent
Jensen

(10) Patent No.: US 8,302,227 B2
(45) Date of Patent: Nov. 6, 2012

(54) ACTUATOR SYSTEM

(75) Inventor: Svend Erik Knudsen Jensen, Sønderborg (DK)

(73) Assignee: Linak A/S, Nordborg (DK)

( * ) Notice: Subject to any disclaimer, the term of this patent is extended or adjusted under 35 U.S.C. 154(b) by 469 days.

(21) Appl. No.: 12/448,602

(22) PCT Filed: Dec. 20, 2007

(86) PCT No.: PCT/DK2007/000554
§ 371 (c)(1),
(2), (4) Date: Jun. 26, 2009

(87) PCT Pub. No.: WO2008/080400
PCT Pub. Date: Jul. 10, 2008

(65) Prior Publication Data
US 2010/0005590 A1    Jan. 14, 2010

(30) Foreign Application Priority Data

Dec. 31, 2006 (DK) .................................. 2006 01721

(51) Int. Cl.
*F16H 3/06* (2006.01)
*A61G 7/05* (2006.01)
(52) U.S. Cl. ................................ 5/616; 5/424; 74/89.23
(58) Field of Classification Search ............. 5/611, 616, 5/624; 74/89.23
See application file for complete search history.

(56) References Cited

U.S. PATENT DOCUMENTS
5,276,432 A    1/1994  Travis
(Continued)

FOREIGN PATENT DOCUMENTS
DE    19950689    11/2000
(Continued)

OTHER PUBLICATIONS
English Abstract of DE19950689.
(Continued)

*Primary Examiner* — Michael Trettel
(74) *Attorney, Agent, or Firm* — Dykema Gossett PLLC

(57) ABSTRACT

Today, electromechanical actuator systems are used in a variety of applications, of which some are more safety critical than others. Likewise, they are used in a wide range of applications where the safety of persons often to a higher or lesser extent depends on that the actuators remains safe both during normal use and in the fault conditions, which may occur. By an actuator comprising a DC motor (2) equipped with a worm drive and a spindle (4), the typical wearing components are the bearing, which carries the spindle (4), the spindle nut (5) and the worm wheel (9) in the worm drive. Common to the described defect situations is that they in the time leading up to the occurrence of the defect will show a decrease in the ratio of efficiency. Whether it is the spindle bearing, the worm drive, the spindle nut (5) or for that matter the motor, which is getting worn, the proportion between the current which the motor absorbs and the force the actuator performs will change. The purpose of the present invention is thus to monitor the ratio of efficiency of the actuator. When this begins to change, becomes worse, it is time to replace the actuator before it becomes defective. For this purpose a load cell can for instance be incorporated in the actuator, for measuring the force on the rear mounting. This force is compared with the power consumption and an indicator for the ratio of efficiency can thus be calculated as force/current.

3 Claims, 1 Drawing Sheet

U.S. PATENT DOCUMENTS

| | | | |
|---|---|---|---|
| 5,481,769 A * | 1/1996 | Schneider | 5/617 |
| 5,613,255 A * | 3/1997 | Bish et al. | 5/611 |
| 5,726,911 A | 3/1998 | Canada et al. | |
| 6,178,837 B1 * | 1/2001 | Nagai et al. | 74/89.23 |
| 6,469,263 B1 * | 10/2002 | Johnson | 177/144 |
| 6,539,566 B1 | 4/2003 | Hayes | |
| 6,851,144 B2 * | 2/2005 | Wang | 5/610 |
| 7,066,041 B2 | 6/2006 | Nielsen | |
| 7,296,312 B2 * | 11/2007 | Menkedick et al. | 5/611 |
| 7,511,442 B2 | 3/2009 | Jehle et al. | |
| 7,533,591 B2 * | 5/2009 | Wang | 74/89.39 |
| 7,555,953 B2 | 7/2009 | Yoshioka et al. | |
| 7,594,450 B2 * | 9/2009 | Wu et al. | 74/89.38 |
| 7,856,900 B2 * | 12/2010 | Benoit et al. | 74/89.34 |
| 7,930,949 B2 * | 4/2011 | Singh | 74/89.23 |
| 2006/0113933 A1 | 6/2006 | Blanding et al. | |
| 2006/0150333 A1 * | 7/2006 | Harding | 5/618 |
| 2007/0164871 A1 | 7/2007 | Dionne et al. | |
| 2009/0151489 A1 | 6/2009 | Jensen | |

FOREIGN PATENT DOCUMENTS

| | | |
|---|---|---|
| DE | 10120316 | 8/2002 |
| EP | 0647799 | 4/1995 |
| WO | 2006109050 | 10/2006 |

OTHER PUBLICATIONS

English Abstract of EP0647799.

* cited by examiner

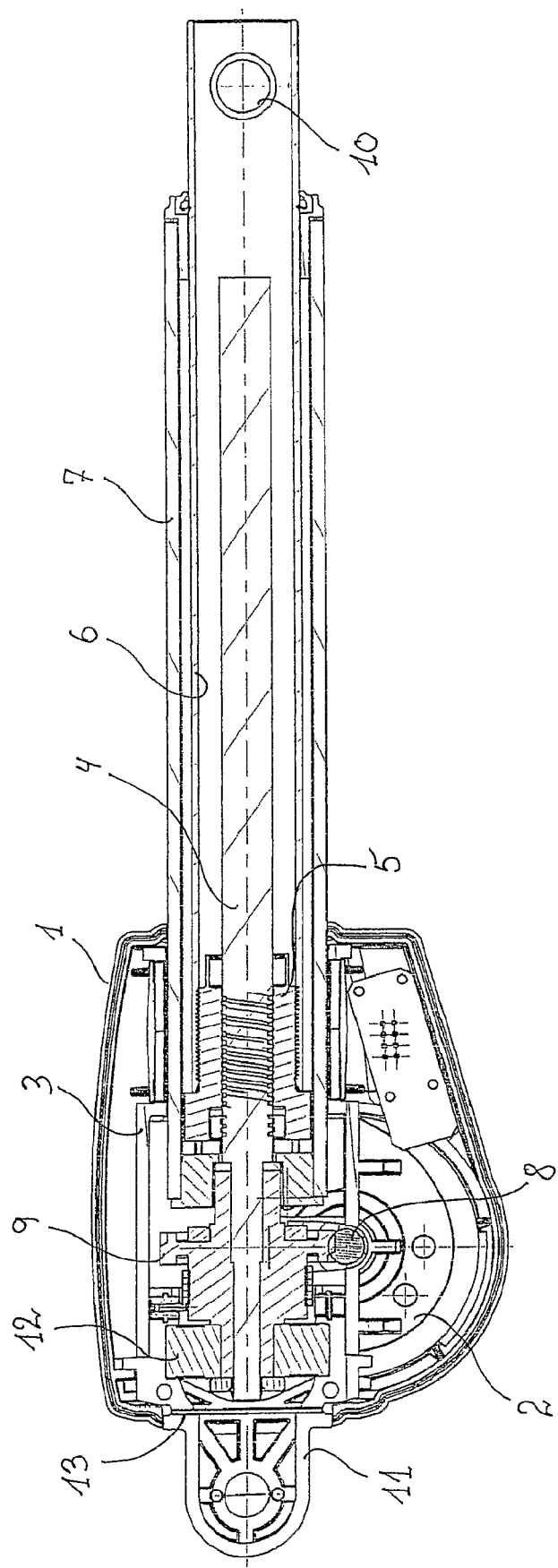

ACTUATOR SYSTEM

The present invention relates to an actuator system as stated in the preamble of claim 1.

Today, actuator systems are used in a variety of applications, of which some are more safety critical than others. Likewise, they are used in a wide range of applications where the safety of persons often to a higher or lesser extent depends on the actuators to remain safe both during normal use and in the fault conditions, which may occur.

A typical application where the risk is very visible is for instance a patient lifter. Here an actuator, which breaks down, will constitute a great risk for the patient hanging in a sling in the patient lifter. In this situation it is very important that the actuator, when it fails, always will fail in a way causing the actuator to stop working, but not collapse. A patient lifter of this type is for instance known from DE 199 50 689 Okin.

By an electro mechanical linear actuator comprising a DC motor equipped with a worm drive and a spindle, the typical wearing components are the bearing, which carries the spindle, the spindle nut and the worm wheel in the worm drive. The spindle nut and the worm wheel are for noise reasons among other things typically made of plastic. Such actuators are for instance known from EP 0 647 799 B1 and EP 1 322 876 B1 both Linak A/S When an actuator is worn-out, it somewhat differs, which parts breaks down and the consequence is also very different.

If the worm drive is worn, this will at some point no longer be able to carry the force on the teeth. Shortly before the breakage the meshing between the worm wheel and the worm become so poor that the efficiency ratio decreases causing part of the power to become frictional heat in the worm wheel, which further weakens, causing the plastic to give in and the teeth to be torn off.

When the defect occurs, it will typically not become dangerous as the worm wheel will block the spindle and thus prevent the spindle nut from moving downward and a blocked actuator will be experienced.

If the bearing carrying the spindle is worn, it will increase its resistance when it is carrying the load. It can be said that the rate of efficiency drops and with the same load on the patient lifter the force, which the worm wheel must transmit, increases as it must compensate for the further power which the friction in the bearing assumes. This can lead to an increased load on the motor and thereby the worm wheel. The increased power consumption will in some situations cause the control unit for the system to switch off due to overcurrent. In other situations it will merely deliver the extra current and the motor thus performs a greater moment through the worm wheel. The worm wheel can then be damaged and the consequence hereof can be an increased wear on the worm wheel, which again can lead to break down.

At particularly low spindle pitches, it is however often the spindle nut which becomes worn. The spindle nut which carries the entire load can become so worn that the thread inside no longer is able to carry the load and it is ripped off. Such a defect can be fatal. A highly loaded actuator can at maximum power on the whole loose its bearing strength immediately corresponding to free fall. A patient in a patient lifter can in this situation be severely injured and perhaps even be killed.

In order to secure against this, a safety nut is today typically used or by having a large mechanically constructive over sizing. A safety nut will, when the actual spindle nut is worn down assume the load. It is, however, constructed so that it can only carry the load in a lowering situation. It can thus not lift any load again.

It is noted that linear actuators with collection of operating data for monitoring the state of the actuators are known from WO 2006/034712 A1 Linak A/S and EP 1 653 240 A1 AB SKF.

The object of the invention is to provide a solution to the outlined problem with break down of the application wherein the actuator is incorporated as a result of wearing of the actuator.

Common to the described defect situations is that they, in the time leading up to the occurrence of the defect, will show a decrease in the rate of efficiency. Whether it is the spindle bearing, the worm drive, the spindle nut or for that matter the motor, which is getting worn, the proportion between the current which the motor absorbs and the power the actuator performs will change.

If for instance the current and time for an actuator is monitored in a life span test with a constant load during the entire life span, it can for instance clearly be seen that the power consumption and the time required for a lift is significantly increased in the days up to the break down of the actuator, irrespective of whether it is the bearing, spindle nut or worm drive that breaks down.

Thus, the purpose of the present invention is to monitor the efficiency of the actuator. When this begins to change, becomes worse, it is time to replace the actuator before it becomes defective. It is the monitoring of the efficiency, which distinguishes the invention from the constructions dealt with in WO 2006/034712 A1 and EP 1 653 240 A1.

For this purpose a load cell can for instance be incorporated in the actuator, for measuring the force on the rear mounting. This force in compared with the power consumption and an indicator for the rate of efficiency can thus be calculated as force/current.

Load cells are often characterized by being expensive but other and cheaper technologies may also be chosen. The load cell can for instance be replaced with a piezoelement, which likewise is used as a load cell. They are not particularly accurate but as the idea of the invention is to monitor changes in the efficiency, it has no relevance, what the absolute value is.

The load cell does not necessarily have to be built into the actuator or be located in connection to the actuator. For instance in respect to hospital beds, particularly the expensive models increasingly have load systems incorporated cf. for instance U.S. Pat. No. 5,276,432 Stryker. Concerning for instance a bed with actuators in the form of lifting columns, one at each end of the bed, cf. for instance DE 101 20 316 C1 Völker, then the force on the actuators is also known. It should of course be distributed among two columns, but as the centre of gravity of the bed can be calculated by means of the load cells the power distribution on the bed is also known, and current (power consumption) can be compared with power and distance (power output). This is again the indicator for wearing.

If the application mentioned above is not equipped with lifting columns but actuators in a scissor mechanism, one at each end, the invention may still be applied, but the force must then be compensated for the gear ratio on the scissor. This type of hospital bed is for instance known from WO 00/33785 Huntleigh. This is somewhat more complicated but with an increased calculating capacity (more powerful processor) in the control boxes, this is also possible.

The idea described here may be used in various ways, but it is primarily for:
  Preventive replacement of components, in order to prevent break downs and accidents.

Online connection to a service center, which initiates a service visit.

The preventive replacement during routine visits requires that the defect can be anticipated rather long into the future. Here it is probably more realistic that the control unit chooses not to run the actuator any longer, when the indicators show a risk for break.

The online connection with the new communication technologies is a better solution. A control box/actuator having this system incorporated can automatically request service and indicate which component(s) is/are to be replaced in time, before defects on the actuator occur. Hereby both accidents and downtime on the application can be prevented.

For the sake of completeness there is a short description below of a linear actuator in connection with the accompanying drawing.

FIG. 1, a longitudinal section through a linear actuator.

The main components of the actuator are constituted by an outer housing 1 in two parts with a reversible electric motor 2, on the front part of which a housing 3 is mounted. The electric motor 2 drives over a worm drive a spindle 4 with a spindle nut 5, to which is secured a tube shaped activation rod 6 surrounded by a guide- and protective tube 7, which with one end is held in the housing 3. The spindle nut is guided secured against rotation in the guide- and protective tube 7, which causes the spindle nut 5 with the activation rod 6 to project out when the motor runs in one direction and to be retracted when the motor changes its direction of rotation. The worm drive consists of a worm 8, designed as an extension of the motor axle and a worm wheel 9, secured to a shaft end of the spindle 4. For mounting the actuator an outer end of the activation rod 6 is equipped with an eye 10 for a mounting bolt and in the rear end of the actuator is a rear mounting 11 likewise with an eye for a mounting bolt. The rear mounting 11 is secured to the end of the housing 3. The spindle 4 is with a ball bearing 12 embedded in the rear mounting so that the force on the activation rod 6 is transferred directly to the rear mounting via the spindle nut and spindle. For measuring the force on the rear mounting, a load cell, here a piezoelement 13, may be incorporated in connection with this. For this purpose the rear mounting can be designed in two parts and the piezoelement 13 inserted in the assembly surface between the two parts. The power consumption for the motor can be registered and by comparing the force registered by the piezoelement 13 with the power consumption, an indicator for the ratio of efficiency can be calculated as power/current. It is noted that a control box (not shown) with a mains based power supply and possibly also a rechargeable battery package, to allow the actuator to run independent of the mains supply, is connected with the actuator. Furthermore, the control box contains a control unit containing a micro processor for registering the power and the power consumption and calculating the ratio of efficiency as force/current. Moreover, there is a control, typically a hand control and/or a control panel for operating the actuator.

The invention claimed is:

1. An actuator system comprising at least one electromechanical linear actuator which includes a reversible electric motor (2), which via a gear drives a spindle (4) with a spindle nut (5) with an activation element, and a rear mounting (11); a power supply; a control unit with a control, at least one load cell for measuring the force on the rear mounting (11), and means for monitoring a ratio of efficiency of the actuator by comparing force on the rear mounting with power consumption.

2. The actuator system according to claim 1, wherein said at least one load cell comprises a piezoelement.

3. The actuator system according to claim 1, incorporated in an apparatus having a weighing system used to calculate the force on the actuator.

* * * * *